US011029697B2

(12) United States Patent
Cunningham et al.

(10) Patent No.: US 11,029,697 B2
(45) Date of Patent: Jun. 8, 2021

(54) SYSTEMS AND METHODS FOR VEHICULAR NAVIGATION

(71) Applicant: Toyota Research Institute, Inc., Los Altos, CA (US)

(72) Inventors: Alexander G. Cunningham, Ann Arbor, MI (US); Robert A. E. Zidek, Ann Arbor, MI (US); Noah J. Epstein, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 187 days.

(21) Appl. No.: 16/387,676

(22) Filed: Apr. 18, 2019

(65) Prior Publication Data

US 2020/0218277 A1    Jul. 9, 2020

Related U.S. Application Data

(60) Provisional application No. 62/789,008, filed on Jan. 7, 2019.

(51) Int. Cl.
  *G05D 1/02*    (2020.01)
  *G06K 9/00*    (2006.01)
  (Continued)

(52) U.S. Cl.
  CPC ....... *G05D 1/0238* (2013.01); *B60W 50/0097* (2013.01); *B60W 50/0205* (2013.01);
  (Continued)

(58) Field of Classification Search
  CPC .................................................. G05D 1/0238
  See application file for complete search history.

(56) References Cited

U.S. PATENT DOCUMENTS 6,694,233 B1 * 2/2004 Duff ..................... G05D 1/0246
                                                                701/23
2019/0250641 A1 * 8/2019 Beer ..................... G01S 13/933
(Continued)

OTHER PUBLICATIONS

Pawlowski, "Tracking Dynamic Obstacles in a Structured Urban Environment and Subsequent Decision Making for an Autonomous Ground Vehicle," Master's Thesis, Case Western Reserve University School of Graduate Studies, Aug. 2008, found at https://etd.ohiolink.edu/rws_etd/document/get/case1213804587/inline.
(Continued)

*Primary Examiner* — Anne Marie Antonucci
*Assistant Examiner* — Abdalla A Khaled
(74) *Attorney, Agent, or Firm* — Christopher G. Darrow; Darrow Mustafa PC

(57) ABSTRACT

Systems and methods described herein relate to vehicular navigation. One embodiment generates a polyline reference path for a vehicle; stores a representation of the polyline in a data structure; detects a plurality of obstacles ahead of the vehicle; identifies one or more obstacle gates among the plurality of obstacles using path coordinates relative to the reference path, each obstacle gate including at least one cluster of obstacles; identifies one or more gaps within each of the one or more obstacle gates; determines an obstacle-avoidance path for the vehicle that passes through a particular one of the one or more gaps in each of the one or more obstacle gates; and controls one or more aspects of operation of the vehicle based, at least in part, on the obstacle-avoidance path.

20 Claims, 8 Drawing Sheets

(51) Int. Cl.
  *B60W 50/14* (2020.01)
  *G05D 1/00* (2006.01)
  *B60W 50/00* (2006.01)
  *B60W 50/02* (2012.01)
  *B60W 50/029* (2012.01)
  *G07C 5/08* (2006.01)

(52) U.S. Cl.
  CPC .......... *B60W 50/029* (2013.01); *B60W 50/14* (2013.01); *G05D 1/0055* (2013.01); *G05D 1/0088* (2013.01); *G05D 1/0212* (2013.01); *G06K 9/00798* (2013.01); *G06K 9/00805* (2013.01); *G07C 5/0808* (2013.01); *B60W 2050/0083* (2013.01); *B60W 2050/021* (2013.01); *B60W 2050/0215* (2013.01); *B60W 2050/146* (2013.01); *G05D 1/0231* (2013.01); *G05D 1/0255* (2013.01); *G05D 1/0257* (2013.01); *G05D 2201/0213* (2013.01)

(56) References Cited

U.S. PATENT DOCUMENTS

2019/0315350 A1* 10/2019 Oguro .................... B60W 30/12
2019/0317520 A1* 10/2019 Zhang ................ B60W 50/0098
2020/0086888 A1* 3/2020 Engle .................... B60W 30/18

OTHER PUBLICATIONS

Liu et al., "An Approach for Indoor Path Computation among Obstacles that Considers User Dimension," ISPRS International Journal of Geo-Information, Dec. 17, 2015, found at https://www.mdpi.com/2220-9964/4/4/2821/pdf.

López-Sánchez et al., "Mapping an Outdoor Environment for Path Planning," Jun. 1998, found at https://s3.amazonaws.com/academia.edu.documents/7864946/10.1.1.45.2508.pdf?AWSAccessKeyId=AKIAIWOWYYGZ2Y53UL3A&Expires=1543437174&Signature=8JcLIeedrQqT%2FFbgNwH5osPc%2FG0%3D&response-content-disposition=inline%3B%20filename%3DMapping_an_outdoor_environmnent_for_path.pdf.

Liu et al., "Collision-free Navigation for Mobile Robots by Grouping Obstacles," Proceedings of the 2015 IEEE Conference on Robotics and Biomimetics, Zhuhai, China, Dec. 6-9, 2015 (available from IEEE Xplore Digital Library).

Terrones et al., "Local Distributed Control for Multi-Robot Navigation," Proceedings of the Fifteenth International Conference on Climbing and Walking Robots and the Support Technologies for Mobile Machines, Baltimore, MD, USA, Jul. 23-26, 2012, found at https://www.researchgate.net/profile/Angel_Terrones2/publication/262676264_Local_Distributed_Control_for_Multi-Robot_Navigation/links/0a85e53866552425cd000000.pdf.

* cited by examiner

SYSTEMS AND METHODS FOR VEHICULAR NAVIGATION

CROSS-REFERENCE TO RELATED APPLICATION

This application claims the benefit of U.S. Provisional Patent Application No. 62/789,008, "Systems and Methods for Controlling Aspects of a Vehicle," filed Jan. 7, 2019, which is incorporated by reference herein in its entirety.

TECHNICAL FIELD

The subject matter described herein relates in general to vehicles and, more specifically, to systems and methods for vehicular navigation.

BACKGROUND

Localization and navigation are important aspects of autonomous vehicles. Automated navigation can become more difficult in the presence of obstacles or obstructions such as construction cones, stalled vehicles, barricades, debris, etc., that can partially block or render impassable a lane of traffic. Often, such obstacles are not shown in on-line digital maps. Consequently, autonomous vehicles rely on sensors to detect stationary or dynamic objects in the environment, including unexpected obstacles, and, when possible, determine a trajectory permitting the vehicle to navigate safely around the obstacles. Such dynamic vehicular navigation in the presence of obstacles can be computationally demanding for the vehicle's navigation and control systems.

SUMMARY

An example of a system for vehicular navigation is presented herein. The system comprises one or more sensors to produce sensor data, one or more processors, and a memory communicably coupled to the one or more processors. The memory stores an obstacle-avoidance module including instructions that when executed by the one or more processors cause the one or more processors to generate a reference path for a vehicle for at least a portion of a route. The reference path is a polyline including a plurality of nodes connected by line segments, the plurality of nodes including an origin node. The obstacle-avoidance module also includes instructions to store a representation of the polyline in a data structure that includes a plurality of cells, the plurality of cells corresponding, respectively, to the plurality of nodes, each cell in the plurality of cells having a corresponding index and storing contents including a signed arclength to the origin node. The obstacle-avoidance module also includes instructions to detect, based on the sensor data, a plurality of obstacles ahead of the vehicle along the route. The obstacle-avoidance module also includes instructions to identify one or more obstacle gates among the plurality of obstacles using path coordinates relative to the reference path, each obstacle gate including at least one cluster of obstacles, the path coordinates of a given obstacle in the plurality obstacles including an index corresponding to a particular cell in the plurality of cells, the signed arclength to the origin node stored in the particular cell, and a lateral offset from the reference path. The obstacle-avoidance module also includes instructions to identify one or more gaps within each of the one or more obstacle gates. The obstacle-avoidance module also includes instructions to determine an obstacle-avoidance path for the vehicle that passes through a particular one of the one or more gaps in each of the one or more obstacle gates. The memory also stores a control module including instructions that when executed by the one or more processors cause the one or more processors to control one or more aspects of operation of the vehicle based, at least in part, on the obstacle-avoidance path.

Another embodiment is a non-transitory computer-readable medium for vehicular navigation and storing instructions that when executed by one or more processors cause the one or more processors to generate a reference path for a vehicle for at least a portion of a route. The reference path is a polyline including a plurality of nodes connected by line segments, the plurality of nodes including an origin node. The instructions also cause the one or more processors to store a representation of the polyline in a data structure that includes a plurality of cells, the plurality of cells corresponding, respectively, to the plurality of nodes, each cell in the plurality of cells having a corresponding index and storing contents including a signed arclength to the origin node. The instructions also cause the one or more processors to detect, based on sensor data, a plurality of obstacles ahead of the vehicle along the route. The instructions also cause the one or more processors to identify one or more obstacle gates among the plurality of obstacles using path coordinates relative to the reference path, each obstacle gate including at least one cluster of obstacles, the path coordinates of a given obstacle in the plurality obstacles including an index corresponding to a particular cell in the plurality of cells, the signed arclength to the origin node stored in the particular cell, and a lateral offset from the reference path. The instructions also cause the one or more processors to identify one or more gaps within each of the one or more obstacle gates. The instructions also cause the one or more processors to determining an obstacle-avoidance path for the vehicle that passes through a particular one of the one or more gaps in each of the one or more obstacle gates. The instructions also cause the one or more processors to control one or more aspects of operation of the vehicle based, at least in part, on the obstacle-avoidance path.

Another embodiment is a method of vehicular navigation, the method comprising generating a reference path for a vehicle for at least a portion of a route. The reference path is a polyline including a plurality of nodes connected by line segments, the plurality of nodes including an origin node. The method also includes storing a representation of the polyline in a data structure that includes a plurality of cells, the plurality of cells corresponding, respectively, to the plurality of nodes, each cell in the plurality of cells having a corresponding index and storing contents including a signed arclength to the origin node; detecting, based on sensor data, a plurality of obstacles ahead of the vehicle along the route; identifying one or more obstacle gates among the plurality of obstacles using path coordinates relative to the reference path, each obstacle gate including at least one cluster of obstacles, the path coordinates of a given obstacle in the plurality obstacles including an index corresponding to a particular cell in the plurality of cells, the signed arclength to the origin node stored in the particular cell, and a lateral offset from the reference path; identifying one or more gaps within each of the one or more obstacle gates; determining an obstacle-avoidance path for the vehicle that passes through a particular one of the one or more gaps in each of the one or more obstacle gates; and controlling one or more aspects of operation of the vehicle based, at least in part, on the obstacle-avoidance path.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The embodiments described herein can improve vehicular navigation in the presence of obstacles by identifying closely spaced clusters of obstacles as "obstacle gates," identifying the gaps (unobstructed areas) within the obstacle gates, and determining a path—in some embodiments an optimal path—through the gaps that permits a vehicle to continue along a route while avoiding the obstacles. Moreover, the embodiments described herein implement obstacle-gates-based navigation in an efficient manner that permits constant-time (O(1)) recovery of Cartesian coordinates from path coordinates (spatial coordinates defined relative to a reference path represented by a polyline). The path coordinates can be used in analyzing spatial relationships among the detected obstacles and in specifying a path that avoids the obstacles.

The techniques discussed in connection with the embodiments described herein can be applied to both autonomous vehicles and to guiding a human driver around obstacles, when the vehicle is being operated manually. The guidance, in some embodiments, includes displaying obstacle gates and an obstacle-avoidance path through gaps among the obstacle gates on a display device (e.g., on heads-up display unit) of the vehicle. Even in embodiments in which the vehicle is driven autonomously, such a display can provide the occupants of the vehicle with useful information regarding the vehicle's navigation decisions in the presence of obstacles.

Figure 1:
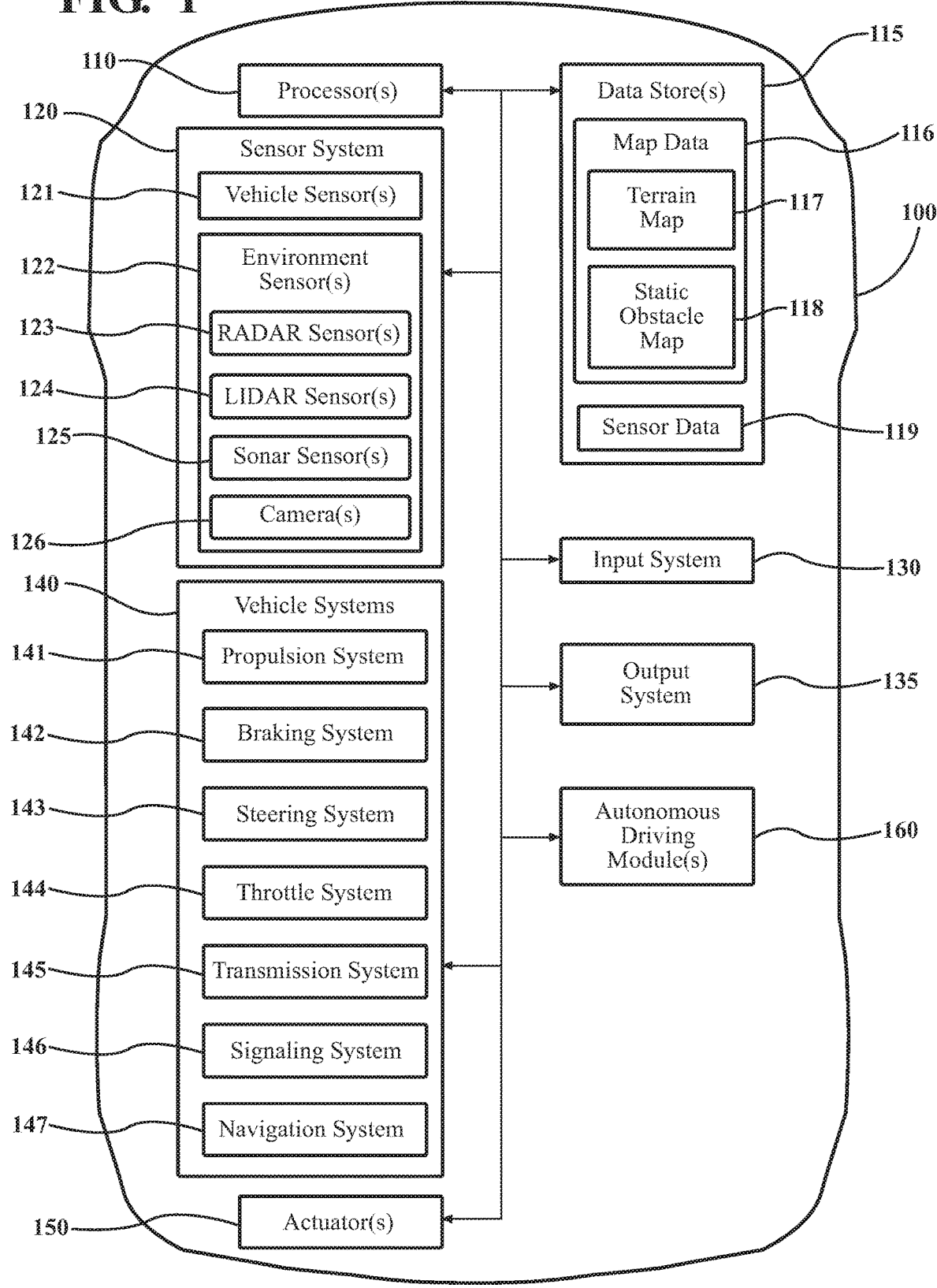
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously. As discussed further below, in some embodiments, vehicle 100 is capable of highly or fully autonomous driving. In other embodiments, vehicle 100 is a parallel-autonomy vehicle whose control (steering, braking, acceleration, etc.) is shared between a human driver and autonomous driving module(s) 160 or an advanced driver-assistance system (ADAS) (not shown in FIG. 1). In still other embodiments, vehicle 100 is driven manually by a human driver without automated driver assistance, though, as discussed below, visual guidance for navigating around detected obstacles can be provided to a driver on a display device within vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

The vehicle 100 includes a navigation system 147 that is implemented to perform methods and other functions as disclosed herein relating to vehicular navigation, including in the presence of obstacles or obstructions along a roadway. Examples of obstacles include, without limitation, other vehicles (whether moving or stationary), construction cones, barricades, construction equipment (whether moving or stationary), and debris (lumber, chunks of concrete, etc.).

Figure 2:
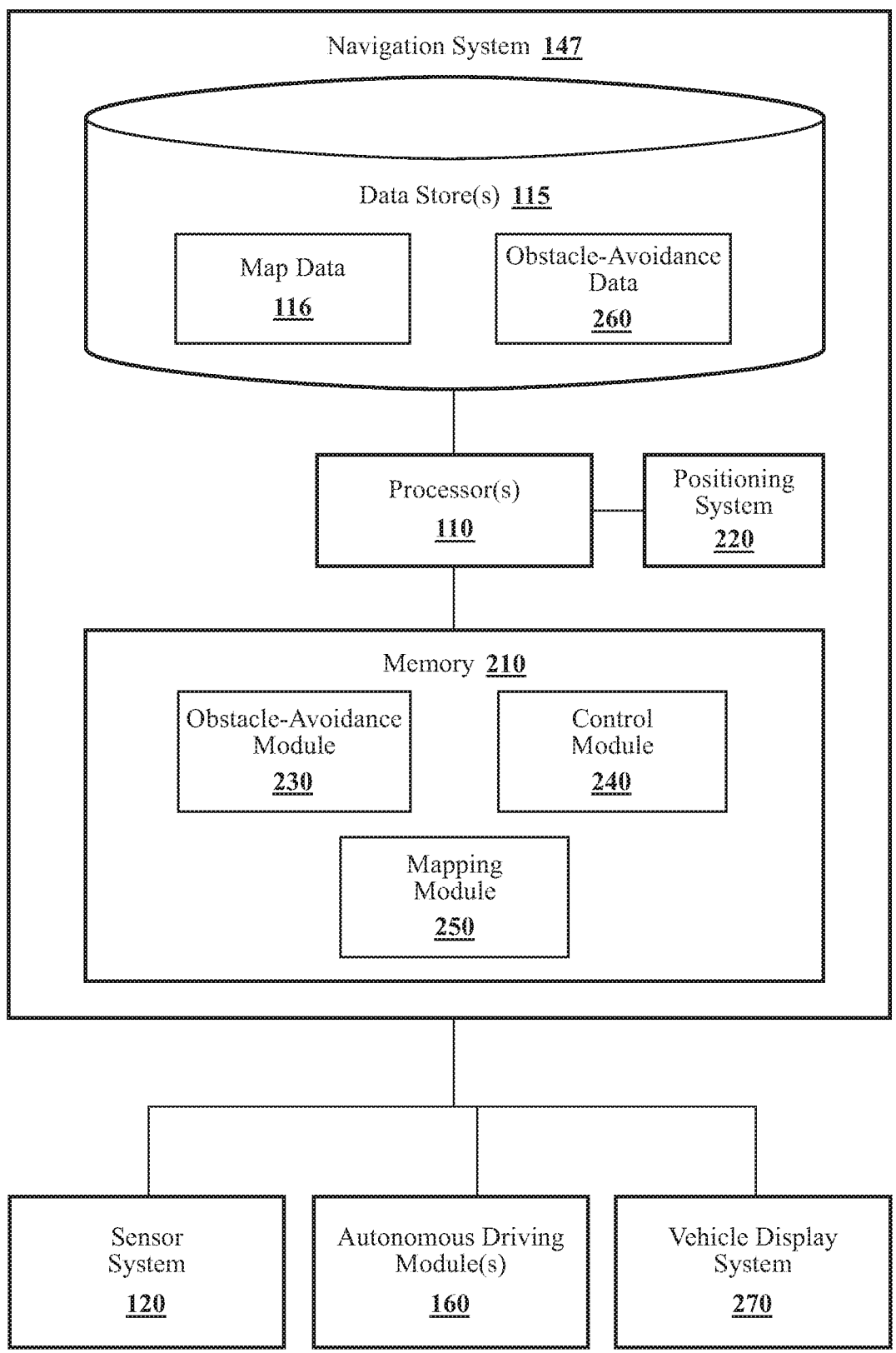
FIG. 2 illustrates one embodiment of a navigation system.

With reference to FIG. 2, one embodiment of the navigation system 147 of FIG. 1 is further illustrated. The navigation system 147 is shown as including one or more processors 110 from the vehicle 100 of FIG. 1. Accordingly, the one or more processors 110 may be a part of the navigation system 147, the navigation system 147 may include one or more separate processors from the one or more processors 110 of the vehicle 100, or the navigation system 147 may access the one or more processors 110 through a data bus or another communication path, depending on the embodiment.

Navigation system 147 can include one or more devices, sensors, applications, and/or combinations thereof, now known or later developed, configured to determine the geographic location of the vehicle 100 and/or to determine a travel route for the vehicle 100. Other functions that navigation system 147 performs in various embodiments are discussed in detail below. The navigation system 147 can include a mapping module 250 to determine a travel route for the vehicle 100. The navigation system 147 can also include a positioning system 220. Depending on the particular embodiment, positioning system 220 can be a global positioning system (GPS), a local positioning system, a geolocation system, or a combination of such systems.

In one embodiment, the navigation system 147 includes a memory 210 that stores an obstacle-avoidance module 230, a control module 240, and a mapping module 250. The memory 210 is a random-access memory (RAM), read-only memory (ROM), a hard-disk drive, a flash memory, or other suitable memory for storing the modules 230, 240, and 250. The modules 230, 240, and 250 are, for example, computer-readable instructions that when executed by the one or more processors 110, cause the one or more processors 110 to perform the various functions disclosed herein.

In connection with performing navigation functions for vehicle 100, navigation system 147 can store various kinds of obstacle-avoidance data 260 in data store(s) 115. Obstacle-avoidance data 260 can include, for example, data associated with reference paths (paths constructed assuming the absence of obstacles), data structures that store reference paths, output paths (obstacle-avoidance paths) to avoid obstacles, information for converting between path coordinates and Cartesian coordinates, etc. Data store(s) 115 can also store map data 116 used by mapping module 250 and other modules in navigation system 147, such as obstacle-avoidance module 230 and control module 240.

As shown in FIG. 2, navigation system 147 can receive sensor data from sensor system 120. For example, in some embodiments, navigation system 147 receives image data from one or more cameras 126. Navigation system 147 may also receive LIDAR data from LIDAR sensors 124, radar data from radar sensors 123, and/or sonar data from sonar sensors 125, depending on the particular embodiment. As also indicated in FIG. 2, navigation system 147, in particular control module 240, can communicate with autonomous driving module(s) 160 to control aspects of vehicle systems 140 such as propulsion system 141, steering system 143, and braking system 142 when vehicle 100 is operating in an autonomous, semi-autonomous, or driver-assistance driving mode.

Obstacle-avoidance module 230 generally includes instructions that cause the one or more processors 110 to perform functions pertaining to obstacle avoidance. More specifically, in one embodiment, one aspect of obstacle-avoidance module 230 is generating a reference path for a vehicle 100 (sometimes referred to herein as an "ego vehicle") for at least a portion of a route, wherein the reference path is a polyline including a plurality of nodes connected by line segments, the plurality of nodes including an origin node. Another aspect is storing a representation of the polyline in a data structure that includes a plurality of cells, the plurality of cells corresponding, respectively, to the plurality of nodes, each cell in the plurality of cells having a corresponding index and storing contents that include a signed arclength to the origin node. Another aspect is detecting, based on data from sensor system 120, a plurality of obstacles ahead of vehicle 100 along the route.

Another aspect of obstacle-avoidance module 230 is identifying one or more obstacle gates among the plurality of obstacles using path coordinates relative to the reference path, each obstacle gate including at least one cluster of obstacles, the path coordinates of a given obstacle in the plurality obstacles including an index corresponding to a particular cell in the plurality of cells, the signed arclength to the origin node stored in that particular cell, and a lateral offset from the reference path. Another aspect is identifying one or more gaps within each of the one or more obstacle gates. Another aspect is determining an obstacle-avoidance path for the vehicle that passes through a particular one of the one or more gaps in each of the one or more obstacle gates. The various aspects of obstacle-avoidance module 230 mentioned above are explained in greater detail below in connection with FIGS. 3-7.

As discussed above, in some embodiments, obstacle-avoidance module 230 identifies obstacle gates and gaps within obstacle gates. In these embodiments, obstacle-avoidance module 230, analyzing data from sensor system 120, continually looks for obstacles close to a lane in which vehicle 100 is traveling. If obstacle-avoidance module 230 detects one or more obstacles that cannot be avoided by traveling down the center of the lane, obstacle-avoidance module 230 identifies obstacle gates in order to find a path around the obstacles. In these embodiments, an obstacle gate includes at least one cluster of obstacles, and each cluster of obstacles includes at least one obstacle. Obstacle-avoidance module 230 can cluster or group obstacles by measuring the distance between obstacles. Obstacles that are too close together for vehicle 100 to drive between can be grouped together as an effective composite obstacle. In some embodiments, an obstacle gate is modeled as an approximately rectangular strip perpendicular to and spanning the lane of travel that includes at least one cluster of obstacles (such a cluster can, in a boundary case, include just a single obstacle) and, in some cases, one or more gaps (unobstructed regions), as explained further below.

Once obstacle-avoidance module 230 has identified the clusters of obstacles in the environment and has associated them with one or more obstacle gates perpendicular to and spanning the lane of travel, obstacle-avoidance module 230 analyzes the sensor data to identify gaps between clusters of obstacles within the respective obstacle gates or between clusters of obstacles in the respective obstacle gates and one or both lane boundaries. Specifically, in these embodiments, obstacle-avoidance module 230 looks for gaps that are large enough for vehicle 100 to drive through safely. In some embodiments, obstacle-avoidance module 230, in assessing gaps, takes into account not only the width of vehicle 100 but also allows for a predetermined amount of padding between a gap through which vehicle 100 is to travel and a left or right lane boundary. These concepts are discussed in greater detail in connection with FIG. 3.

Figure 3:
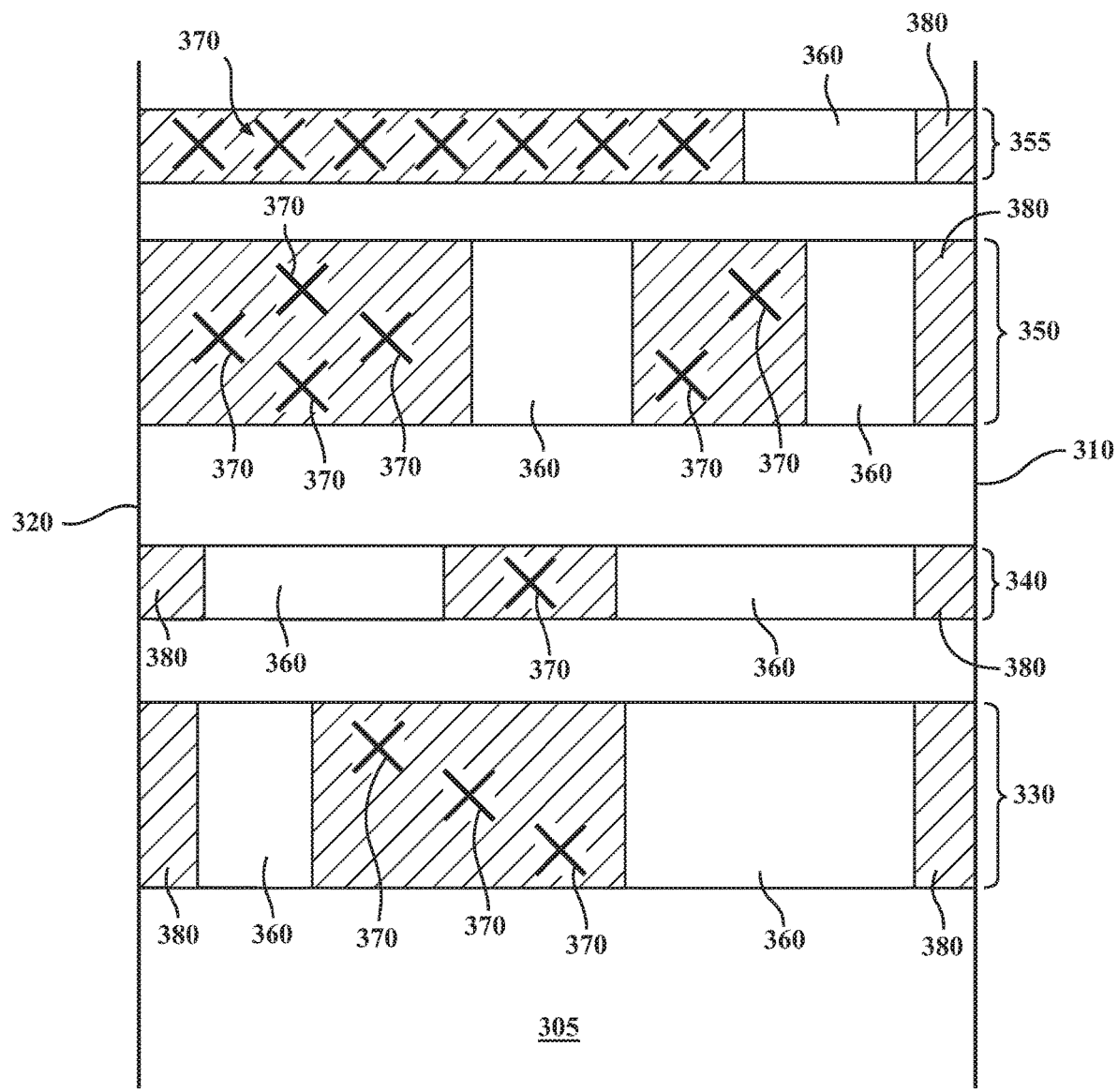
FIG. 3 illustrates a model of a portion of a roadway along which several obstacle gates have been identified, in accordance with an illustrative embodiment of the invention.

FIG. 3 illustrates a model of a portion of a roadway along which obstacle-avoidance module 230 has identified several obstacle gates, in accordance with an illustrative embodiment of the invention. In the scenario depicted in FIG. 3, vehicle 100 is currently traveling in lane 305, whose boundaries are delineated by right lane boundary 310 and left lane boundary 320. In this example, obstacle-avoidance module 230 has identified, based on sensor data from sensor system 120, obstacle gates 330, 340, 350, and 355.

Obstacle gate 330 includes three obstacles 370 in a cluster/group and two gaps 360. Additionally, in this embodiment, obstacle-avoidance module 230 has identified two areas of padding 380 along and within the left and right edges of lane 305 to provide vehicle 100 with some additional buffer or safety margin for passing through one of the gaps 360 in obstacle gate 330.

Obstacle gate 340 includes one obstacle cluster and two gaps 360 (in this case, the obstacle cluster includes only one obstacle 370). Obstacle-avoidance module 230 has also identified padding 380 along either edge of lane 305.

Obstacle gate 350 includes a cluster of four obstacles 370 and another cluster of three obstacles 370. This obstacle gate also includes two gaps 360. Due to the size and placement of the obstacles in the cluster on the left side of obstacle gate 350, padding 380 is available only on the right side.

Obstacle gate 355 includes one large cluster of six obstacles 370 in a line (e.g., a line of construction cones), one gap 360, and padding 380 on the right edge of lane 305.

As shown in FIG. 3, in this embodiment, each obstacle gate spans the width of lane 305 and is approximately perpendicular to lane 305 (in this embodiment, this would still be the case even if the portion of lane 305 illustrated were curved). In some embodiments, if no gap is available in an obstacle gate because one or more obstacles completely block lane 305 (e.g., a barricade closes the lane entirely), obstacle-avoidance module 230 can expand the obstacle gate to span a lane adjacent to lane 305 (not shown in FIG. 3), identify one or more gaps within the expanded obstacle gate spanning both lanes, and determine an obstacle-avoidance path that passes through a gap in the adjacent lane to permit vehicle 100 to avoid the obstacles blocking lane 305.

Depending on the embodiment, obstacle-avoidance module 230, in identifying gaps 360 within obstacle gates, can impose additional constraints beyond width (e.g., the width of vehicle 100 plus padding 380). For example, in some embodiments, obstacle-avoidance module 230 also imposes a longitudinal (length) constraint on gaps 360.

Figure 4B:
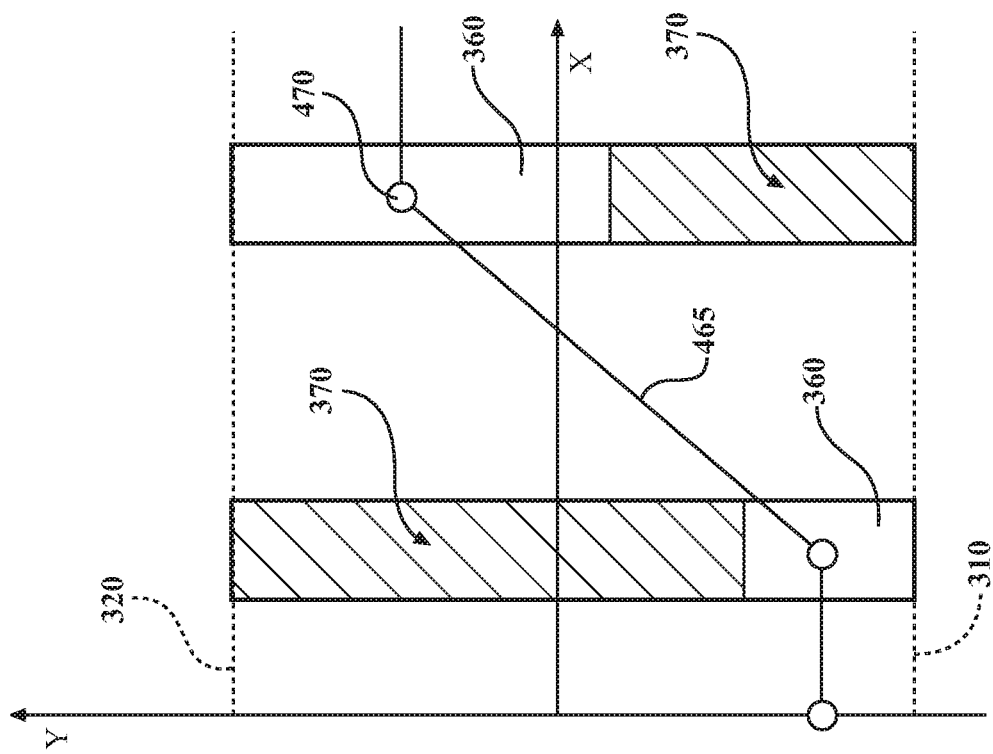
FIG. 4B illustrates a path-coordinates counterpart to the model in FIG. 4A, in accordance with an illustrative embodiment of the invention.
Figure 4A:
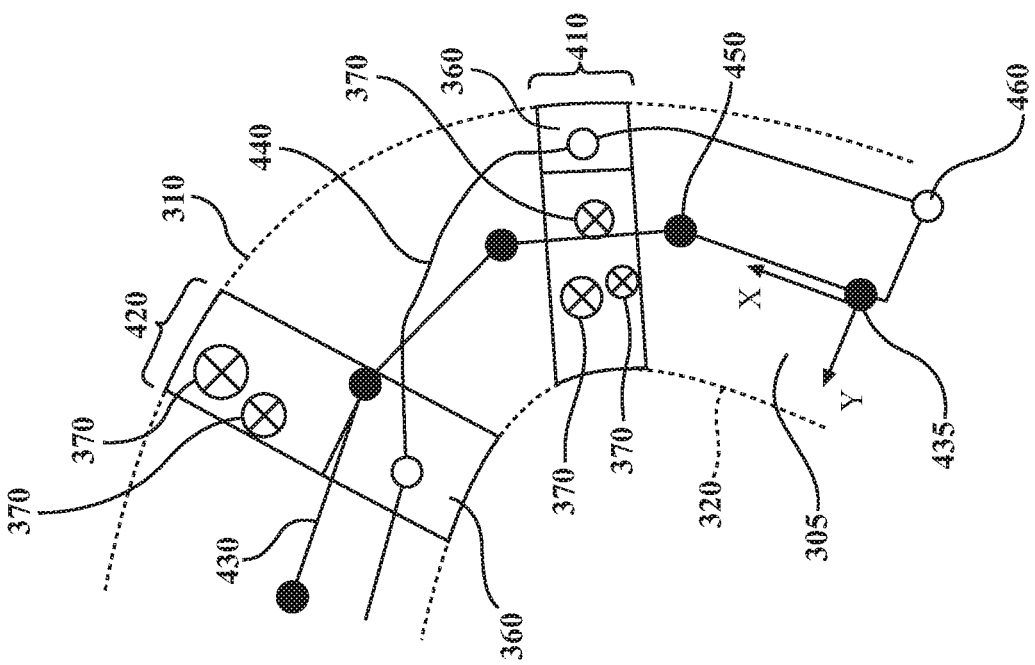
FIG. 4A illustrates a model of a portion of a lane showing obstacle gates, a reference path, and an obstacle-avoidance path, in accordance with an illustrative embodiment of the invention.

FIG. 4A illustrates a model of a portion of a lane showing obstacle gates, a reference path, and an obstacle-avoidance path, in accordance with an illustrative embodiment of the invention. In the scenario depicted in FIG. 4A, vehicle 100 is traveling along a lane 305, which is delineated by a right lane boundary 310 and a left lane boundary 320. Obstacle-avoidance module 230, based on sensor data from sensor system 120, has identified obstacle gates 410 and 420, each of which includes a plurality of obstacles 370 in a group or cluster and a gap 360.

Obstacle-avoidance module 230 has also generated a reference path 430 along the approximate centerline of lane 305. Reference path 430 represents the default path vehicle 100 would traverse if no obstacles were present in lane 305. In some embodiments, reference path 430 lies within a single lane of a roadway, as illustrated in FIG. 4A. In other embodiments, reference path 430 can traverse more than one lane to accommodate anticipated lane changes or other turns. In the embodiment shown in FIG. 4A, obstacle-avoidance module 230 has represented reference path 430 as a polyline—a series of nodes 450 (represented as dots) connected by line segments. In this embodiment, the lines are straight-line segments. In FIG. 4A, only one node 450 is labeled with a reference numeral for clarity. One of the nodes 450 is arbitrarily designated as an origin node for reference path 430. This origin node is used in formulating path coordinates (spatial coordinates relative to reference path 430), as explained in greater detail below. In the example of FIG. 4A, this particular node is path coordinates origin 435.

Obstacle-avoidance module 230, in this embodiment, has also determined an obstacle-avoidance path 440 to permit vehicle 100 to avoid the grouped obstacles 370 in the obstacle gates 410 and 420. In general, such a path passes through a particular one of the one or more gaps in each obstacle gate. In some embodiments, obstacle-avoidance module 230 employs an optimal graph-traversal path-search algorithm such as A*, which is known to those skilled in the art, in determining an obstacle-avoidance path. Obstacle-avoidance path 440 can be defined, at least in part, by nodes 460 (only one such node is labeled with a reference numeral in FIG. 4A for clarity). In the example of FIG. 4A, obstacle-avoidance module 230 has determined that the best path through the obstacles 370 is through the gap 360 on the right side of obstacle gate 410 and through the gap 360 on the left side of obstacle gate 420.

FIG. 4B illustrates a path-coordinates counterpart to the model in FIG. 4A, in accordance with an illustrative embodiment of the invention. FIG. 4B depicts the same scenario as in FIG. 4A but in terms of path coordinates—spatial coordinates relative to reference path 430. The details of how path coordinates are formulated are discussed below in connection with FIGS. 5A and 5B. In FIG. 4B, the obstacle-avoidance path (see element 440 in FIG. 4A) is represented in path coordinates as obstacle-avoidance polyline 465. This polyline representation of the obstacle-avoidance path is made up of nodes 470 connected by line segments. The obstacle-avoidance path 440 in FIG. 4A, in this embodiment, is a smoothed version of the obstacle-avoidance polyline 465 shown in FIG. 4B. Smoothing obstacle-avoidance polyline 465 can be accomplished through a variety of smoothing algorithms. In one embodiment, the smoothing algorithm includes quadratic programming.

Figure 5A:
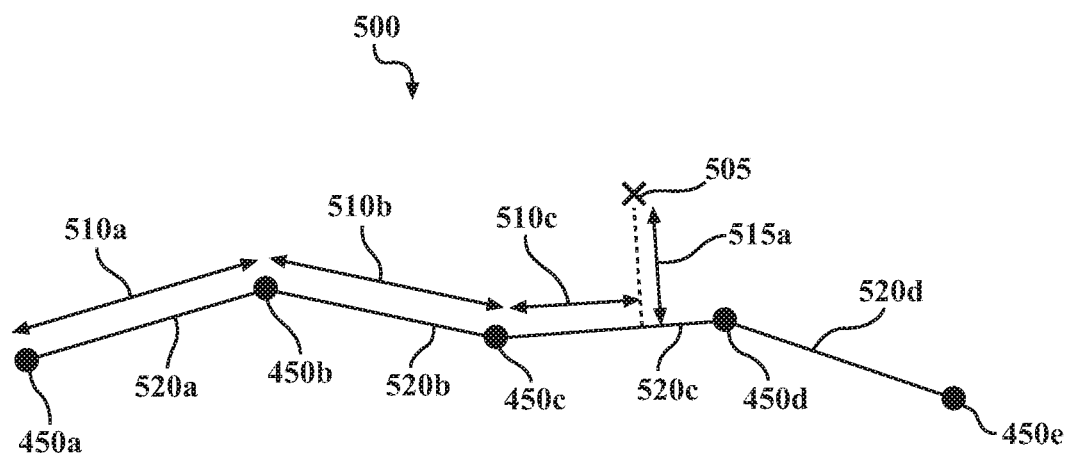
FIGS. 5A and 5B illustrate examples of polyline reference paths and determining path coordinates for a location, in accordance with an illustrative embodiment of the invention.
Figure 5B:
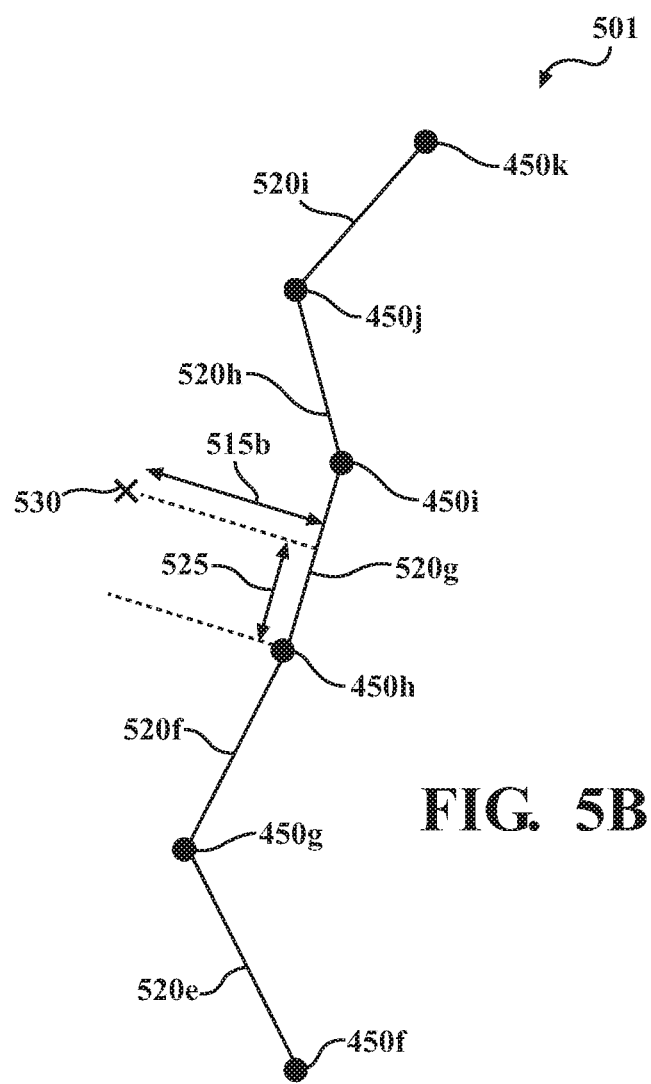

FIGS. 5A and 5B illustrate examples of reference paths represented as polylines and determining path coordinates for a location in the environment of vehicle 100, in accordance with an illustrative embodiment of the invention. In FIG. 5A, reference path 500 is defined by reference-path nodes 450a-e and line segments 520a-d. The path coordinates of an arbitrary location 505 (marked with an "x") can be specified as the following tuple: (signed arclength from the origin, lateral offset, segment index). In this example, the origin node is node 450a, which is assigned an index of zero. The other nodes 450b-e are assigned indexes 1, 2, 3, and 4, respectively. The signed arclength from the origin (i.e., from node 450a) of location 505 is the sum of the distances 510a, 510b, and 510c. The lateral offset from reference path 500 is lateral offset 515a, which is measured along a line that is orthogonal to reference path 500 (the dotted line in FIG. 5A). The segment index associated with location 505 is 2, the index of the last node encountered (450c) as one traces reference path 500 from the origin node 450a toward location 505 to the point where lateral offset 515a is defined.

FIG. 5B shows another example of a reference path 501 in the form of a polyline and formulating path coordinates for an arbitrary location 530. Reference path 501 is defined by reference-path nodes 450f-k and line segments 520e-i. In this example, the origin node is node 450h, which has an index of zero. Node 450f has an index of −2, node 450g has an index of −1, node 450i has an index of 1, node 450j has an index of 2, and node 450k has an index of 3. The path coordinates for location 530 can again be specified by the tuple (signed arclength from the origin, lateral offset, segment index). In this case, the signed arclength from the origin, for location 530, is the distance 525 (a positive number reckoned from origin node 450h). The lateral offset is lateral offset 515$b$. The index associated with location 530 is zero because, in tracing reference path 501 from origin node 450$h$ toward the point along reference path 501 at which lateral offset 515$a$ is measured, origin node 450$h$ is the first and only node encountered.

In at least some embodiments, expressing the locations of detected obstacles and/or the nodes making up obstacle-avoidance paths in terms of path coordinates (coordinates relative to a reference path) improves the efficiency of the computations obstacle-avoidance module 230 performs. This formulation allows for efficient calculation of arc-lengths between obstacles as obstacle-avoidance module 230 identifies clusters of obstacles to define obstacle gates. Path coordinates can also be sorted without the need to access the polyline reference path, and a location with path coordinates can be projected along a polyline by a fixed distance to generate new path coordinates. Path coordinates can be used to recover the Cartesian coordinates for a location efficiently with a constant-time (O(1)) access into an array (discussed further below) and a O(1) projection from one node to the next by the path coordinate's signed arclength to the origin node.

Regarding obtaining Cartesian coordinates from path coordinates, the path coordinates, as explained above, specify the line segment (line segment index) and its position on the line segment (signed arclength from the origin node). Call the position on the line segment point $p_s$. The normal $n_s$ of the line segment (the unit vector that is perpendicular to the line segment, obtained by rotating the line segment by 90 degrees in a positive direction and then normalizing it) is extended by the lateral-offset distance l. Therefore, the point in Cartesian coordinates $p_c$ can be expressed as $p_c = p_s + l \cdot n_s$, where the bold typeface indicates vector quantities.

Figure 6:
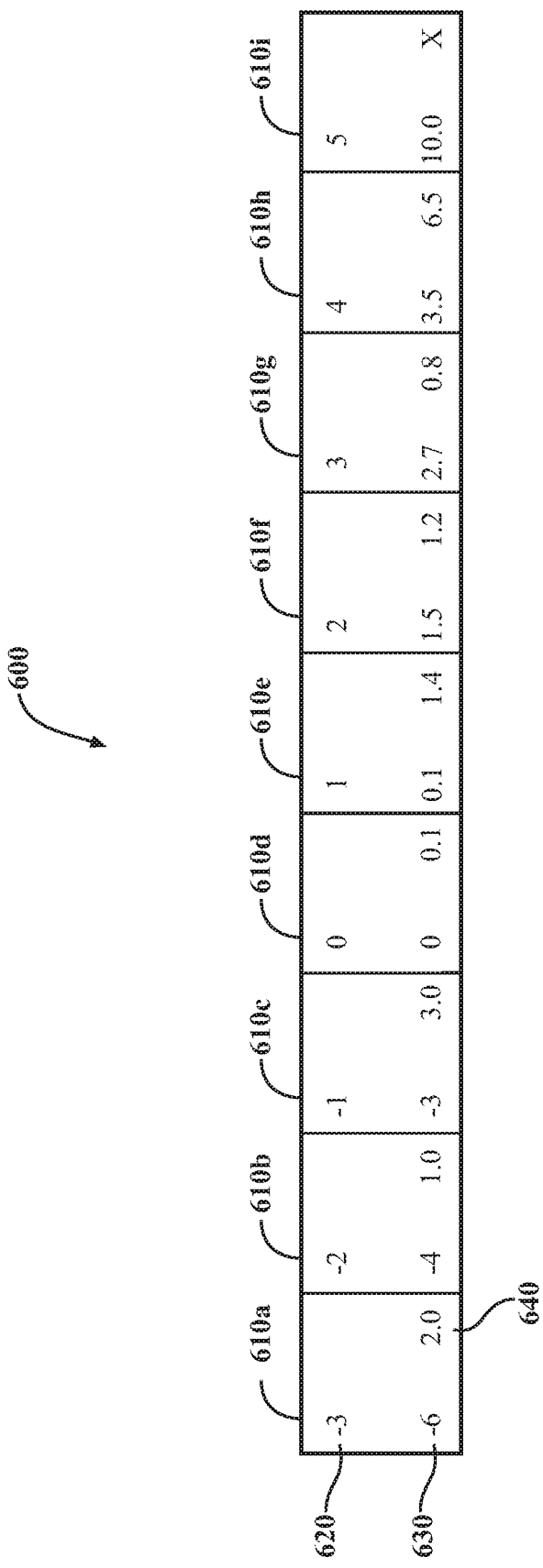
FIG. 6 illustrates a data structure in which a polyline representation of a reference path can be stored, in accordance with an illustrative embodiment of the invention.

FIG. 6 illustrates a data structure 600 in which a polyline representation of a reference path can be stored, in accordance with an illustrative embodiment of the invention. In the example of FIG. 6, data structure 600 is an array containing nine cells 610$a$-$i$, each of which corresponds to a unique node in a polyline representation of a reference path (in this simple example, there are nine nodes in the polyline representing the reference path). In this embodiment, each cell of data structure 600 has an associated index 620 that can be used in addressing that particular cell. As shown in FIG. 6, the cells 610$a$-$i$ have indexes −3, −2, −1, 0, 1, 2, 3, 4, and 5, respectively. Each cell stores a signed arclength 630 to the origin node (represented in FIG. 6 by cell 610$d$). In this embodiment, each cell also stores a distance 640 to the next node in the represented polyline. Though reference numerals are used to label only the values associated with cell 610$a$ in FIG. 6, analogous signed arclengths 630 to the origin node 610$d$ and distances 640 to the next node in the polyline are stored in the other cells 610$b$-$i$. Data structure 600 can be used to formulate path coordinates efficiently for locations associated with detected obstacles 370 and/or for locations along an obstacle-avoidance path that diverges, in at least some respects, from a reference path, as discussed above.

Control module 240 generally includes instructions that cause the one or more processors 110 to control one or more aspects of the operation of vehicle 100 based, at least in part, on an obstacle-avoidance path determined and output by obstacle-avoidance module 230. In some embodiments, controlling one or more aspects of the operation of vehicle 100 includes displaying one or more obstacle gates and an obstacle-avoidance path on a display device (e.g., a heads-up display unit or "HUD") of vehicle 100 that is part of vehicle display system 270 (see FIG. 2). In one embodiment, control module 240 produces such a display for informational purposes to vehicle occupants (e.g., to inform the occupants that the vehicle has detected certain obstacles and has determined a path that avoids them), when vehicle 100 is operating in an autonomous driving mode. In another embodiment, control module 240 displays the obstacle gates and obstacle-avoidance path in a manner that assists a human driver in steering vehicle 100 along an obstacle-avoidance path, when vehicle 100 is being driven manually.

Figure 7:
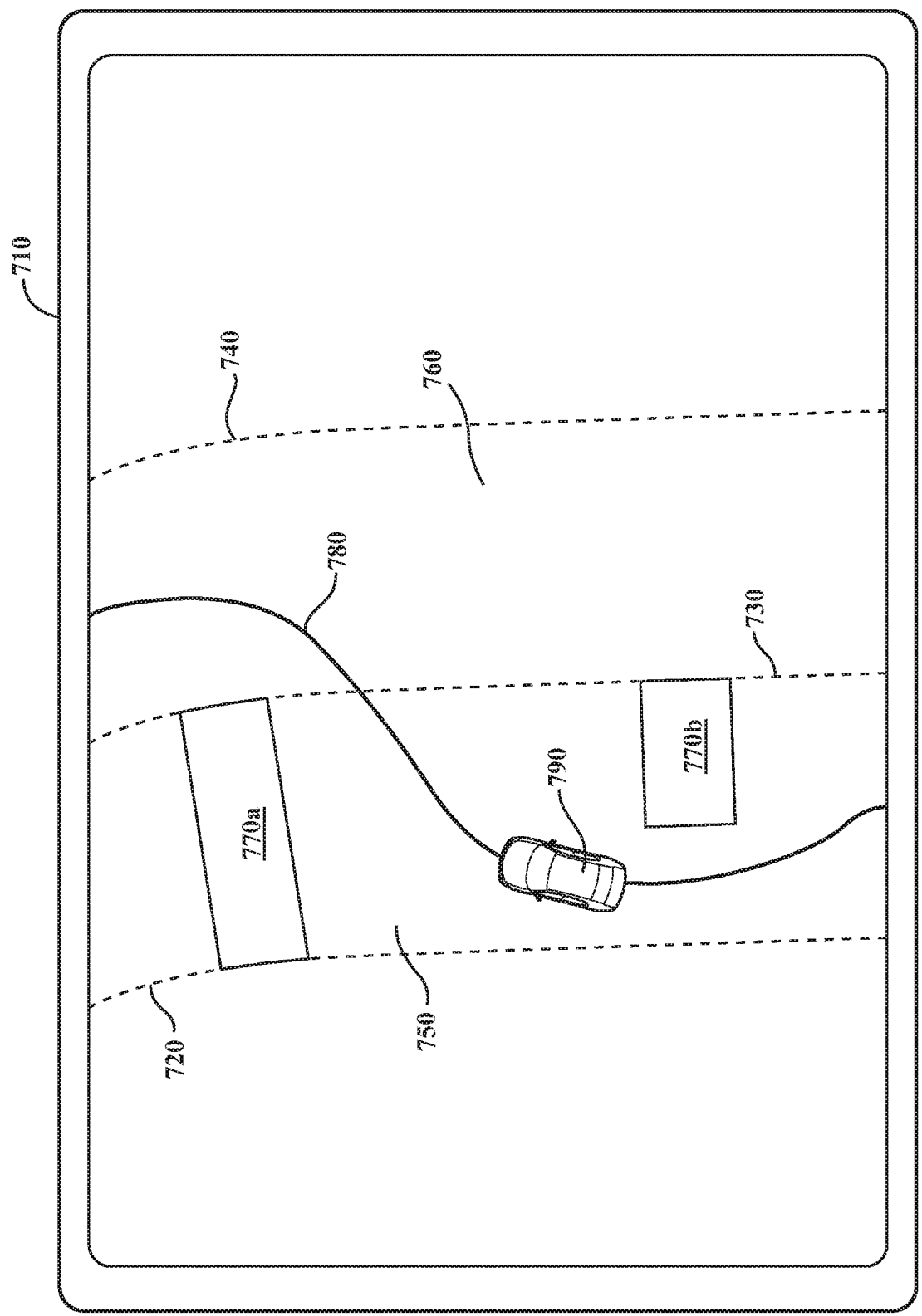
FIG. 7 illustrates a vehicle display device displaying obstacle gates, an obstacle-avoidance path, and guidance for a driver, in accordance with an illustrative embodiment of the invention.

FIG. 7 illustrates a vehicle display device 710 displaying obstacle gates, an obstacle-avoidance path, and guidance for a driver, in accordance with an illustrative embodiment of the invention. In FIG. 7, display device 710 displays two lanes of a roadway, current lane 750 and adjacent lane 760. Current lane 750 is the lane in which vehicle 100 is currently traveling. Current lane 750 and adjacent lane 760 are delineated by lane boundaries 720, 730, and 740. In this embodiment, the display includes the obstacle portions 770$a$ and 770$b$ of two obstacle gates. Obstacle-avoidance module 230 has determined an obstacle-avoidance path 780 that vehicle 100 can traverse to avoid the displayed clustered obstacles in the obstacle gates. In this particular example, the obstacle portion 770$a$ of one of the obstacle gates is completely blocking current lane 750 ahead (this could be, e.g., a barricade closing that lane). As discussed above, obstacle-avoidance module 230 can, in such a situation, expand the obstacle gate of which obstacle portion 770$a$ is a part to span both current lane 750 and adjacent lane 760. Since the entirety of adjacent lane 760 is a gap within that expanded obstacle gate, obstacle-avoidance module 230 can determine an obstacle-avoidance path 780 that makes use of adjacent lane 760 to avoid obstacle portion 770$a$.

Also shown in FIG. 7 is a location and direction indicator 790. Location and direction indicator 790 animatedly moves along obstacle-avoidance path 780 to indicate, in real time, the current location of vehicle 100 and the direction in which vehicle 100 is traveling. Location and direction indicator 790 is used, in some embodiments, to assist a human driver in steering vehicle 100 along the obstacle-avoidance path 780. In those embodiments, it is advantageous for display device 710 to be a HUD so that the driver can keep his or her eyes on the road while consulting display device 710 for guidance in following the obstacle-avoidance path 780.

In other embodiments of control module 240, controlling one or more aspects of the operation of vehicle 100 based, at least in part, on an obstacle-avoidance path includes steering vehicle 100 automatically in accordance with the obstacle-avoidance path while vehicle 100 is operating in an autonomous driving mode. In these embodiments, control module 240 augments the normal autonomous navigation of vehicle 100 by inputting an obstacle-avoidance path to autonomous driving module(s) 160. The autonomous driving module(s) 160 control various vehicle systems 140 (see FIG. 1) such as acceleration, steering, braking, etc., to accomplish autonomous driving.

Figure 8:
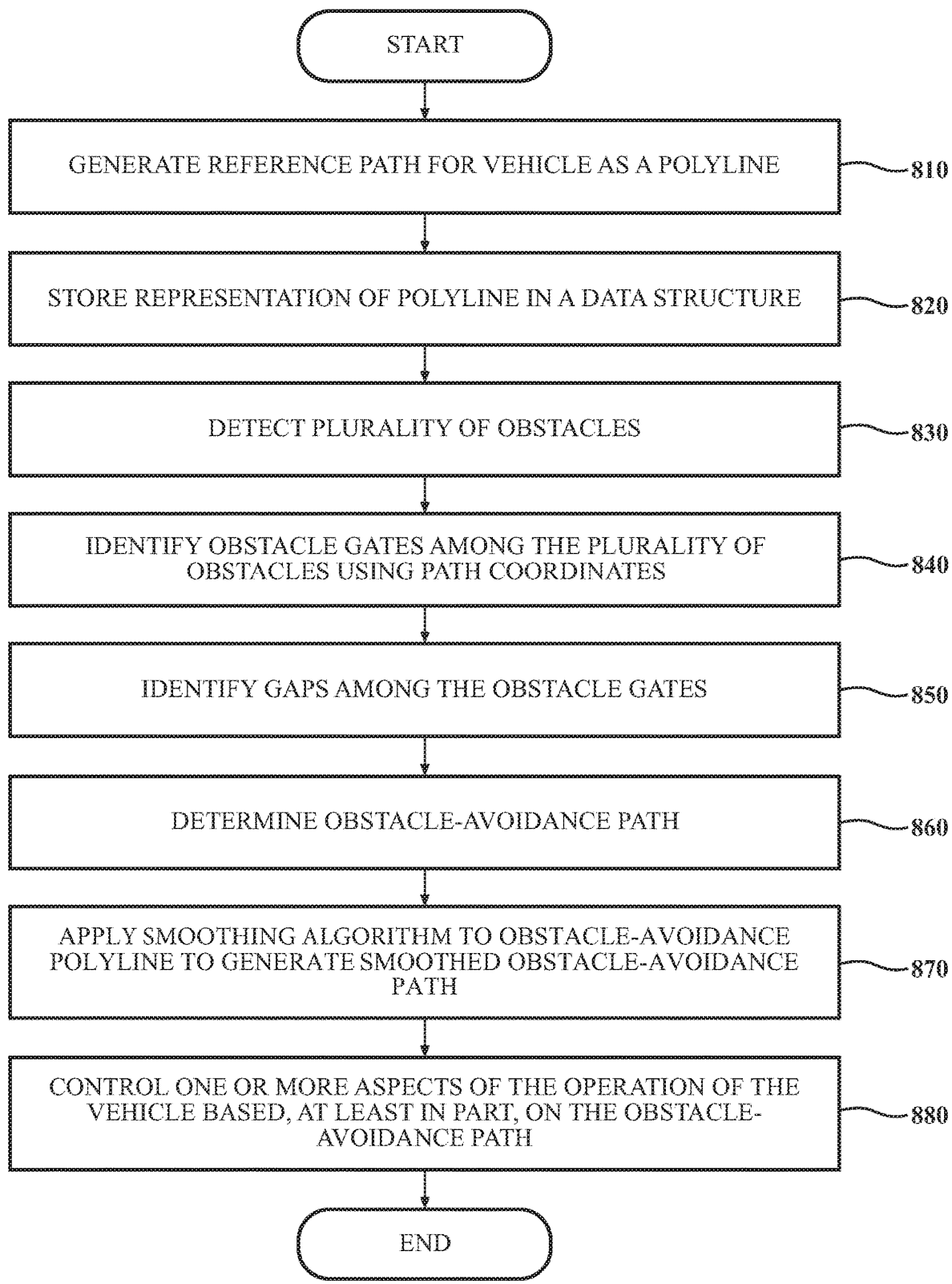
FIG. 8 is flowchart of a method of vehicular navigation, in accordance with an illustrative embodiment of the invention.

FIG. 8 is a flowchart of a method 800 of vehicular navigation, in accordance with an illustrative embodiment of the invention. Method 800 will be discussed from the perspective of navigation system 147 in FIG. 2. While method 800 is discussed in combination with navigation system 147, it should be appreciated that method 800 is not limited to being implemented within navigation system 147, but navigation system 147 is instead one example of a system that may implement method 800.

At block 810, obstacle-avoidance module 230 generates a reference path for vehicle 100 for at least a portion of a route, wherein the reference path is a polyline including a plurality of nodes connected by line segments, the plurality of nodes including an origin node. Examples of polyline representations of reference paths are provided in FIGS. 4A, 5A, and 5B.

At block 820, obstacle-avoidance module 230 stores a representation of the polyline in a data structure that includes a plurality of cells, the plurality of cells corresponding, respectively, to the plurality of nodes (in this embodiment, the mapping of cells to nodes is one-to-one), each cell in the plurality of cells having a corresponding index and storing contents that include a signed arclength to the origin node. One example of such a data structure is provided in FIG. 6.

At block 830, obstacle-avoidance module 230 detects, based on sensor data from sensor system 120, a plurality of obstacles ahead of the vehicle along the route, as discussed above in connection with FIG. 3. The formulation and use of path coordinates is discussed above in connection with FIGS. 4B, 5A, 5B, and 6.

At block 840, obstacle-avoidance module 230 identifies one or more obstacle gates among the plurality of obstacles using path coordinates relative to the reference path, each obstacle gate including at least one cluster of obstacles, the path coordinates of a given obstacle in the plurality obstacles including an index corresponding to a particular cell in the plurality of cells in the data structure, the signed arclength to the origin node stored in that particular cell, and a lateral offset from the reference path. At block 850, obstacle-avoidance module 230 identifies one or more gaps within each of the one or more obstacle gates. As discussed above, in some embodiments, each obstacle gate spans the width of the lane of travel and is approximately perpendicular to the lane. Depending on the embodiment, obstacle-avoidance module 230 can impose certain width and length (in the longitudinal direction along the lane) constraints on the identification of gaps within obstacle gates, as discussed above. As also discussed above, in some embodiments, obstacle-avoidance module 230 can expand an obstacle gate to span an adjacent lane, in addition to the current lane of travel, if the obstacle portion of an obstacle gate is blocking so much of the current lane of travel that vehicle 100 cannot navigate around the obstacles in that lane without moving into the adjacent lane.

At block 860, obstacle-avoidance module 230 determines an obstacle-avoidance path for vehicle 100 that passes through a particular one of the one or more gaps in each of the one or more obstacle gates. The obstacle-avoidance path permits vehicle 100 to avoid the obstacles.

At block 870, obstacle-avoidance module 230 optionally applies a smoothing algorithm to an obstacle-avoidance polyline (polyline representation of the obstacle-avoidance path in terms of path coordinates) to generate a smoothed obstacle-avoidance path. As mentioned above, in one embodiment, the smoothing algorithm includes quadratic programming. An example of an obstacle-avoidance polyline and a corresponding smoothed obstacle avoidance path are provided in FIGS. 4B and 4A, respectively. In some embodiments, block 880 is omitted from method 800.

At block 880, control module 240 controls one or more aspects of the operation of vehicle 100 based, at least in part, on the obstacle-avoidance path. As discussed above, depending on the embodiment, controlling one or more aspects of the operation of vehicle 100 can include displaying obstacle gates and an obstacle-avoidance path on a display device within vehicle 100, steering vehicle 100 automatically in accordance with the obstacle avoidance path while vehicle 100 is operating in an autonomous driving mode, or both. In some embodiments, the obstacle gates and obstacle-avoidance path can be displayed in a manner that assists a human driver in steering vehicle 100 in accordance with the obstacle-avoidance path while vehicle 100 is being driven manually.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The processor(s) 110, the navigation system 147, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the navigation system 147, and/or the autonomous driving module(s) 160 may control some or all of these vehicle systems 140 and, thus, may be partially or fully autonomous.

The processor(s) 110, the navigation system 147, and/or the autonomous driving module(s) 160 can be operably connected to communicate with the various vehicle systems 140 and/or individual components thereof. For example, returning to FIG. 1, the processor(s) 110, the navigation system 147, and/or the autonomous driving module(s) 160 can be in communication to send and/or receive information from the various vehicle systems 140 to control the movement, speed, maneuvering, heading, direction, etc. of the vehicle 100. The processor(s) 110, the navigation system 147, and/or the autonomous driving module(s) 160 may control some or all of these vehicle systems 140.

The processor(s) 110, the navigation system 147, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the navigation system 147, and/or the autonomous driving module(s) 160 can control the direction and/or speed of the vehicle 100. The processor(s) 110, the navigation system 147, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the navigation system 147 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for vehicular navigation, the system comprising:
   one or more sensors to produce sensor data;
   one or more processors; and
   a memory communicably coupled to the one or more processors and storing:
   an obstacle-avoidance module including instructions that when executed by the one or more processors cause the one or more processors to:
     generate a reference path for a vehicle for at least a portion of a route, wherein the reference path is a polyline including a plurality of nodes connected by line segments, the plurality of nodes including an origin node;
     store a representation of the polyline in a data structure that includes a plurality of cells, the plurality of cells corresponding, respectively, to the plurality of nodes, each cell in the plurality of cells having a corresponding index and storing contents including a signed arclength to the origin node;
     detect, based on the sensor data, a plurality of obstacles ahead of the vehicle along the route;
     identify one or more obstacle gates among the plurality of obstacles using path coordinates relative to the reference path, each obstacle gate including at least one cluster of obstacles, the path coordinates of a given obstacle in the plurality of obstacles including an index corresponding to a particular cell in the plurality of cells, the signed arclength to the origin node stored in the particular cell, and a lateral offset from the reference path;
     identify one or more gaps within each of the one or more obstacle gates; and
     determine an obstacle-avoidance path for the vehicle that passes through a particular one of the one or more gaps in each of the one or more obstacle gates; and
   a control module including instructions that when executed by the one or more processors cause the one or more processors to control one or more aspects of operation of the vehicle based, at least in part, on the obstacle-avoidance path.

2. The system of claim 1, wherein the reference path lies within a single lane of a roadway.

3. The system of claim 1, wherein the obstacle-avoidance module includes further instructions to:
   expand a particular obstacle gate among the one or more obstacle gates to span a lane adjacent to a lane in which the vehicle is currently traveling;
   identify a gap within the expanded particular obstacle gate; and
   determine an obstacle-avoidance path that passes through the gap within the expanded particular obstacle gate.

4. The system of claim 1, wherein the data structure is an array and the contents of each cell in the plurality of cells include a distance to a next node in the polyline.

5. The system of claim 1, wherein the instructions included in the obstacle-avoidance module to identify one or more gaps among the one or more obstacle gates include instructions to account for a width of the vehicle and for padding within at least one of a right lane boundary and a left lane boundary of a lane of a roadway.

6. The system of claim 1, wherein the instructions included in the obstacle-avoidance module to determine the obstacle-avoidance path for the vehicle include instructions to:
   represent the obstacle-avoidance path as an obstacle-avoidance polyline in terms of path coordinates; and
   apply a smoothing algorithm to the obstacle-avoidance polyline to generate a smoothed obstacle-avoidance path.

7. The system of claim 1, wherein the plurality of obstacles include at least one of other vehicles, construction cones, construction equipment, barricades, and debris.

8. The system of claim 1, wherein the instructions included in the control module to control one or more aspects of operation of the vehicle based, at least in part, on the obstacle-avoidance path include instructions to display the one or more obstacle gates and the obstacle-avoidance path on a display device of the vehicle.

9. The system of claim 8, wherein the instructions to display the one or more obstacle gates and the obstacle-avoidance path on the display device of the vehicle cause the one or more obstacle gates and the obstacle-avoidance path to be displayed in a manner that assists a human driver in steering the vehicle along the obstacle-avoidance path while the vehicle is operating in a manual driving mode.

10. The system of claim 1, wherein the instructions included in the control module to control one or more aspects of operation of the vehicle based, at least in part, on the obstacle-avoidance path include instructions to steer the vehicle automatically in accordance with the obstacle-avoidance path while the vehicle is operating in an autonomous driving mode.

11. The system of claim 1, wherein the one or more sensors include at least one of a camera, a Light Detection and Ranging (LIDAR) sensor, a radar sensor, and a sonar sensor.

12. A non-transitory computer-readable medium for vehicular navigation and storing instructions that when executed by one or more processors cause the one or more processors to:
    generate a reference path for a vehicle for at least a portion of a route, wherein the reference path is a polyline including a plurality of nodes connected by line segments, the plurality of nodes including an origin node;
    store a representation of the polyline in a data structure that includes a plurality of cells, the plurality of cells corresponding, respectively, to the plurality of nodes, each cell in the plurality of cells having a corresponding index and storing contents including a signed arclength to the origin node;
    detect, based on sensor data, a plurality of obstacles ahead of the vehicle along the route;
    identify one or more obstacle gates among the plurality of obstacles using path coordinates relative to the reference path, each obstacle gate including at least one cluster of obstacles, the path coordinates of a given obstacle in the plurality of obstacles including an index corresponding to a particular cell in the plurality of cells, the signed arclength to the origin node stored in the particular cell, and a lateral offset from the reference path;

identify one or more gaps within each of the one or more obstacle gates;

determine an obstacle-avoidance path for the vehicle that passes through a particular one of the one or more gaps in each of the one or more obstacle gates; and control one or more aspects of operation of the vehicle based, at least in part, on the obstacle-avoidance path.

13. A method of vehicular navigation, the method comprising:

generating a reference path for a vehicle for at least a portion of a route, wherein the reference path is a polyline including a plurality of nodes connected by line segments, the plurality of nodes including an origin node;

storing a representation of the polyline in a data structure that includes a plurality of cells, the plurality of cells corresponding, respectively, to the plurality of nodes, each cell in the plurality of cells having a corresponding index and storing contents including a signed arclength to the origin node;

detecting, based on sensor data, a plurality of obstacles ahead of the vehicle along the route;

identifying one or more obstacle gates among the plurality of obstacles using path coordinates relative to the reference path, each obstacle gate including at least one cluster of obstacles, the path coordinates of a given obstacle in the plurality of obstacles including an index corresponding to a particular cell in the plurality of cells, the signed arclength to the origin node stored in the particular cell, and a lateral offset from the reference path;

identifying one or more gaps within each of the one or more obstacle gates;

determining an obstacle-avoidance path for the vehicle that passes through a particular one of the one or more gaps in each of the one or more obstacle gates; and controlling one or more aspects of operation of the vehicle based, at least in part, on the obstacle-avoidance path.

14. The method of claim 13, wherein the reference path lies within a single lane of a roadway.

15. The method of claim 13, further comprising:

expanding a particular obstacle gate among the one or more obstacle gates to span a lane adjacent to a lane in which the vehicle is currently traveling;

identifying a gap within the expanded particular obstacle gate; and determining an obstacle-avoidance path that passes through the gap within the expanded particular obstacle gate.

16. The method of claim 13, wherein identifying one or more gaps among the one or more obstacle gates includes accounting for a width of the vehicle and for padding within at least one of a right lane boundary and a left lane boundary of a lane of a roadway.

17. The method of claim 13, wherein the obstacle-avoidance path is represented as an obstacle-avoidance polyline in terms of path coordinates and the method further comprises:

applying a smoothing algorithm to the obstacle-avoidance polyline to generate a smoothed obstacle-avoidance path.

18. The method of claim 13, wherein controlling one or more aspects of operation of the vehicle based, at least in part, on the obstacle-avoidance path includes displaying the one or more obstacle gates and the obstacle-avoidance path on a display device of the vehicle.

19. The method of claim 18, wherein the one or more obstacle gates and the obstacle-avoidance path are displayed in a manner that assists a human driver in steering the vehicle along the obstacle-avoidance path while the vehicle is operating in a manual driving mode.

20. The method of claim 13, wherein controlling one or more aspects of operation of the vehicle based, at least in part, on the obstacle-avoidance path includes steering the vehicle automatically in accordance with the obstacle-avoidance path while the vehicle is operating in an autonomous driving mode.

* * * * *